US008701108B2

United States Patent
Sekiguchi et al.

(10) Patent No.: US 8,701,108 B2
(45) Date of Patent: Apr. 15, 2014

(54) APPARATUS AND METHOD FOR CONTROLLING LIVE-MIGRATIONS OF A PLURALITY OF VIRTUAL MACHINES

(75) Inventors: Atsuji Sekiguchi, Kawasaki (JP); Masazumi Matsubara, Kawasaki (JP); Yuji Wada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 13/229,796

(22) Filed: Sep. 12, 2011

(65) Prior Publication Data

US 2012/0096460 A1 Apr. 19, 2012

(30) Foreign Application Priority Data

Oct. 15, 2010 (JP) .................. 2010-233020

(51) Int. Cl.
*G06F 9/455* (2006.01)

(52) U.S. Cl.
USPC ............................................................ 718/1

(58) Field of Classification Search
None
See application file for complete search history.

(56) References Cited

U.S. PATENT DOCUMENTS

| 2004/0143664 | A1* | 7/2004 | Usa et al. ................. 709/226 |
| 2009/0077558 | A1* | 3/2009 | Arakawa et al. ............ 718/102 |
| 2010/0115509 | A1* | 5/2010 | Kern et al. ..................... 718/1 |
| 2010/0293412 | A1* | 11/2010 | Sakaguchi et al. ............. 714/17 |
| 2010/0325634 | A1* | 12/2010 | Ichikawa et al. ............ 718/103 |
| 2010/0332658 | A1* | 12/2010 | Elyashev ................ 709/226 |

FOREIGN PATENT DOCUMENTS

| JP | 2004-199561 A | 7/2004 |
| JP | 2010-211546 | 9/2010 |

OTHER PUBLICATIONS

Chenyang, Lu et al., "Aqueduct: online data migration with performance guarantees", Conference on File and Storage Technologies (FAST '02), pp. 219-230, Jan. 28-30, 2002.
Japanese Office Action mailed Feb. 12, 2014 for corresponding Japanese Application No. 2010-233020, with partial English-language translation.

* cited by examiner

*Primary Examiner* — Emerson Puente
*Assistant Examiner* — Sisley Kim
(74) *Attorney, Agent, or Firm* — Fujitsu Patent Center

(57) ABSTRACT

There is provided an apparatus and method for executing live-migrations concurrently on a plurality of virtual machines. Resource-usage state information is acquired from each of the plurality of virtual machines when a first live migration of a first virtual machine is started. A correlation factor indicating a degree of correlation between first resource-usage state information for the first virtual machine and second resource-usage state information for each of one or more virtual machines other than the first virtual machine is calculated using the acquired resource-usage state information. Next, a second virtual machine having a positive correlation factor with respect to the first virtual machine is selected from the one or more virtual machines where the positive correlation factor indicating a close similarity between the first and second resource-usage state information. Then, a second live-migration is executed on the second virtual machine in parallel with the ongoing first live migration.

8 Claims, 11 Drawing Sheets

FIG. 3

| TIME | VM1 | VM2 | VM3 | VM4 | VM5 | VM6 |
|---|---|---|---|---|---|---|
| 0 | 55 | 50 | 76 | 65 | 59 | 32 |
| 1 | 62 | 56 | 77 | 56 | 64 | 38 |
| 2 | 51 | 61 | 84 | 66 | 57 | 52 |
| 3 | 54 | 51 | 83 | 62 | 65 | 45 |
| 4 | 53 | 54 | 82 | 62 | 62 | 38 |
| 5 | 24 | 50 | 81 | 91 | 65 | 43 |
| 6 | 18 | 23 | 81 | 97 | 92 | 38 |
| 7 | 22 | 18 | 81 | 94 | 97 | 41 |
| 8 | 21 | 22 | 81 | 97 | 95 | 38 |
| 9 | 23 | 21 | 82 | 96 | 97 | 49 |
| 10 | 30 | 24 | 83 | 89 | 96 | 42 |

FIG. 4

| FIRST VM | TARGET VMS | | | | |
|---|---|---|---|---|---|
| | VM1 | VM2 | VM3 | VM4 | ... |
| VM1 | - | 0.84 | -0.31 | -0.99 | ... |
| VM2 | 0.85 | - | -0.34 | -0.95 | ... |
| ... | | | | | |

APPARATUS AND METHOD FOR CONTROLLING LIVE-MIGRATIONS OF A PLURALITY OF VIRTUAL MACHINES

CROSS-REFERENCE TO RELATED APPLICATION

This application is based upon and claims the benefit of priority of the prior Japanese Patent Application No. 2010-233020, filed on Oct. 15, 2010, the entire contents of which are incorporated herein by reference.

FIELD

The present invention relates to an apparatus and method for controlling live-migrations of a plurality of virtual machines.

BACKGROUND

In recent years, virtualization technology has been utilized in which a virtual machine (VM) is operated on a physical machine (PM) such as a server. Examples of virtualization technology include a LPAR (Logical PARtitioning) technique and a virtual OS (Operating System). In the LPAR, a physical machine is partitioned into multiple logical partitions by a hardware implementation. According to the virtual OS, a physical machine is separated into multiple logical parts by a software implementation.

In a physical machine, with a LPAR technique or a virtual OS, resources, such as a CPU (Central Processing Unit) and a memory, are virtualized, and a virtual machine (VM) is implemented by executing an OS (Operating System) using the virtualized resources. For example, according to one of methods for allocating virtualized resources to multiple virtual machines, correlation factors are calculated by collecting a resource usage state for each of LPAR logical partitions, and resources are allocated to each of the LPAR logical partitions based on the collected resource usage states and the calculated correlation factors.

In recent years, as an internet service, virtualization technology has been utilized in IaaS (Infrastructure as a Service) providing resources, such as a CPU, a memory, and a software, that are used for an information system.

From the perspective of a provider providing an IaaS, stopping a virtual machine is restricted based on a SLA (Service Level Agreement) that is concluded between an IaaS provider and a user of virtual machines provided as the IaaS, even when maintaining a physical machine on which the virtual machines are operated, or updating the infrastructure for managing the virtual machines. In this case, for example, maintenance of the physical machine may be performed after executing a live-migration of a currently-operated virtual machines, in which the currently-operated virtual machines are dynamically migrated to another physical machine by copying the memory content of the currently-operated virtual machines to the another physical machine.

However, the known live-migration methods have a problem in efficiency of executing a live-migration. For example, consider the case where live-migrations are performed on a plurality of virtual machines. When performing a live-migration, a physical machine consumes resources, such as a CPU, a memory, and a network bandwidth. Therefore, when performing multiple live-migrations at one time, the physical machine consumes a large amount of resources, thereby adversely affecting the other pieces of processing. Alternatively, when executing multiple live-migrations one-by-one on the plurality of virtual machines, although the amount of resources used, at one time, for the multiple live-migrations is reduced, a time needed for executing all the multiple migrations may increase. That is, effective live-migrations may not be attained in both the cases mentioned above.

SUMMARY

According to an aspect of an embodiment, there is provided an apparatus and method for executing live-migrations concurrently on a plurality of virtual machines. When a first live migration of a first virtual machine is started, resource-usage state information is acquired from each of the plurality of virtual machines where the resource usage state indicates a change in an amount of resources being used for providing a service. Next, a correlation factor indicating a degree of correlation between first resource-usage state information for the first virtual machine and second resource-usage state information for each of one or more target virtual machines other than the first virtual machine is calculated using the acquired resource-usage state information for the each of the plurality of virtual machines. Then, a second live-migration is executed on a second virtual machine that is selected from the one or more target virtual machines and has a positive correlation factor with respect to the first virtual machine, while executing the first live-migration on the first virtual machine, wherein the positive correlation factor indicates a close similarity between the first resource-usage state information and the second resource-usage state information.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 3 is a diagram illustrating an example of a transaction count table, according to an embodiment;

FIG. 4 is a diagram illustrating an example of a correlation factor table, according to an embodiment;

DESCRIPTION OF EMBODIMENTS

Figure 1:
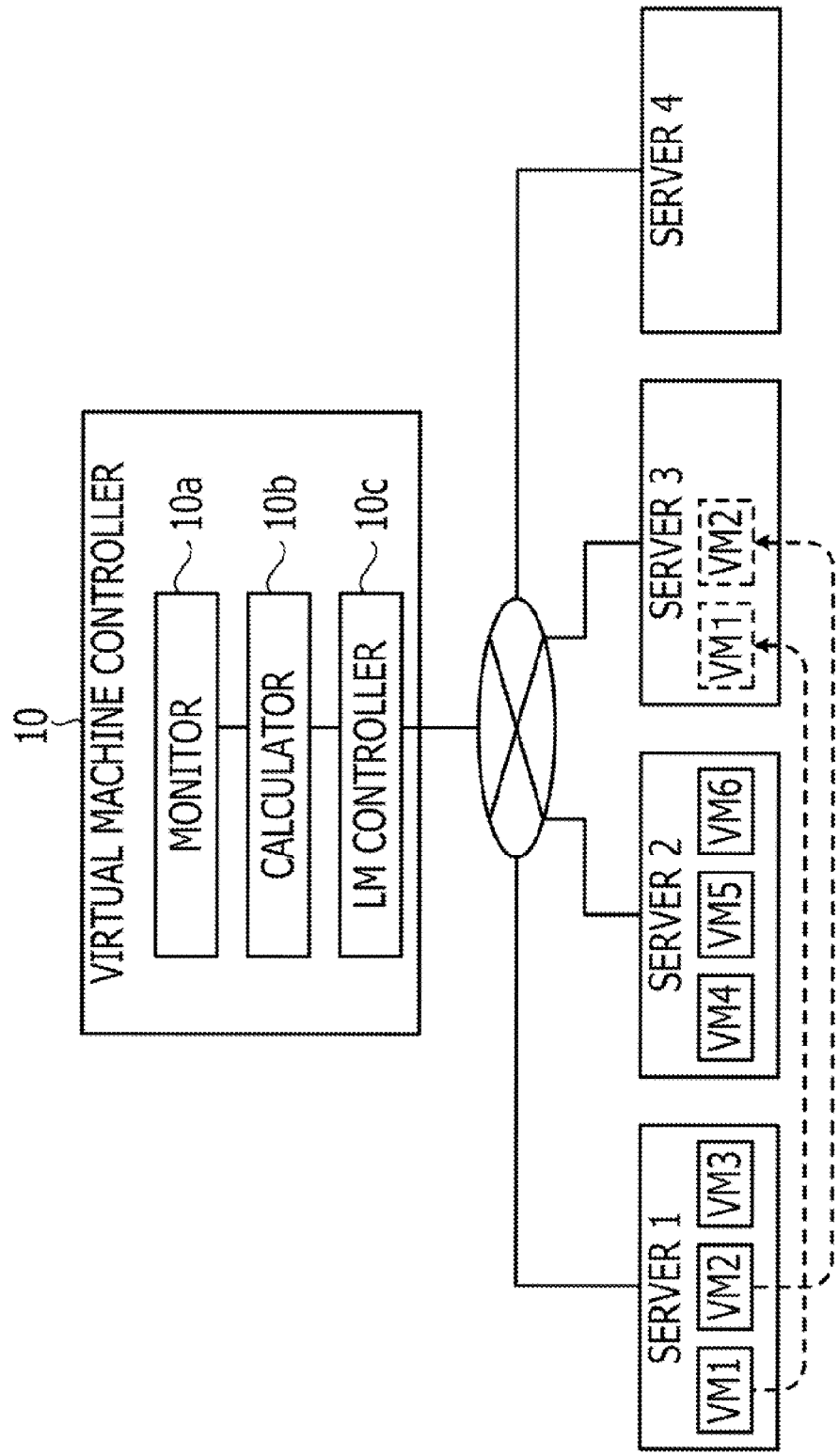
FIG. 1 is a diagram illustrating an example of a system configuration, according to a first embodiment.

FIG. 1 is a diagram illustrating an example of a system configuration, according to a first embodiment. As depicted in FIG. 1, virtual machine controller 10 and servers 1 to 4 are communicably coupled to each other via a network.

Hereinafter, for ease of explanation, a virtual machine and virtual machines will be also expresses as "a VM" and "VMs", respectively. Further, a live-migration (meaning dynamically executing a migration of a VM) will be also expresses as "a LM". In FIG. 1, server 1 is a physical machine that is operating virtual machines (VMs) 1 to 3, and server 2 is a physical machine that is operating VMs 4 to 6. Each of servers 3, 4, is a physical machine that is currently not operating any virtual machines. Each of these servers may be configured as a server that provides, for example, an IaaS (Infrastructure as a Service) in which a Web service is provided using VMs.

Virtual machine controller 10 may be configured to include monitor 10a, calculator 10b, and LM (Live-Migration) controller 10c. Virtual machine controller 10 is a computer that controls the migrations of VMs being operated by each of servers. Here, it is assumed that there exists a restriction imposed on the operation of VMs according to a SLA (Service Level Agreement) that is concluded with a user of the VMs. For example, restrictions may be imposed on stop operations of the VMs in such a way that the total stop time of the VM is limited to less than five minutes per a month.

Here, description will be given of the case where the operations of servers 1 and 2 are stopped due to a maintenance work under the above mentioned restrictions. First, virtual machine controller 10 receives, for example, from a system administrator, a command to execute a first live-migration that migrates a first virtual machine (for example, VM1 that is being operated within server 1) to server 3. Next, virtual machine controller 10 transmits a LM-start command for starting the first live-migration, to server 1. Upon receiving the LM-start command, server 1 starts a live-migration of VM1.

Next, monitor 10a of virtual machine controller 10 collects resource-usage state information for a plurality of virtual machines (for example, VM1 to VM6) that are being operated when the first live-migration of the first virtual machine (for example, VM1) has started. Here, the resource-usage state information indicates a change in an amount of resources being used for providing a service. Then, virtual machine controller 10 calculates a correlation factor indicating a degree of correlation between first resource-usage state information for the first virtual machine (in the case, VM1), of which the live-migration has been started, and second resource-usage state information for each of one or more target virtual machines other than the first virtual machine (VM1), of which live-migrations have not been started yet and are to be executed, using the acquired resource-usage state information collected by monitor 10a. Hereinafter, a virtual machine of which a live-migration has not been started yet and is to be executed will be expressed also as "a target virtual machine".

Thereafter, virtual machine controller 10 selects, from the one or more target virtual machines other than the first virtual machine (VM1), a second virtual machine (for example, VM2) having a positive correlation factor with respect to the first virtual machine (VM1), and a second live-migration to server 3 is performed on the selected second virtual machine (VM2) in parallel with the on-going first live-migration of the first virtual machine (VM1). Here, the positive correlation factor indicates that there exists a close similarity between the first resource-usage state information for the first virtual machine (VM1) and the second resource-usage state information for the second virtual machine (VM2). As a result, server 1 executes the second live-migration on the second virtual machine (VM2) that has a close similarity with the first virtual machine (VM1), in parallel with the ongoing live-migration of the first virtual machine (VM1).

In the case, a time-sequence of transaction counts may be used as resource-usage state information for the each of a plurality of virtual machines, where a transaction counts indicates the number of transactions that are processed per unit time by each of a plurality of virtual machines. Further, since a time-sequence of transaction counts indicates a temporal change of transaction counts, a close similarity between first resource-usage state information and second resource-usage state information means that the first virtual machine and the second virtual machine have the analogous changing trend of transaction counts.

For example, virtual machine controller 10 selects a second virtual machine, from one or more target virtual machines other than the first virtual machine, for which a transaction count (the number of processed transactions) has decreased in a manner analogous to the transaction count for the first virtual machine. In the case, in the second virtual machine, a transaction count decreases due to the bottleneck caused by the ongoing live-migration of the first virtual machine. As a result, there may be enough available resources left in the second virtual machine. By utilizing this situation, virtual machine controller 10 executes a live-migration on the second virtual machine (VM2), without waiting for completion of the ongoing live-migration of the first virtual machine (VM1), that is, while executing the live-migration of the first virtual machine (VM1).

Thereafter, in the example depicted in FIG. 1, when virtual machine controller 10 has completed the live-migrations of the first and second virtual machines (VM1 and VM2), virtual machine controller 10 issues a command to execute a live-migration that migrates VM3 to server 3 by transmitting the command to server 1. Then, virtual machine controller 10 executes a live-migration of VM4 in parallel with the live-migration of VM3, using the above mentioned live-migration method. Further, upon completing the live-migrations of VM3 and VM4, virtual machine controller 10 issues a command to execute a live-migration that transfers VM5 to server 3 by transmitting the command to server 2. Then, virtual machine controller 10 executes a live-migration of VM6 in parallel with the live-migration of VM5, using the above mentioned live-migration method.

According to the above mentioned method, the number of the executed live-migrations may be decreased compared to a method in which live-migrations are executed one-by-one on a plurality of virtual machines (for example, VM1 to VM6). Further, because live-migrations are concurrently performed on virtual machines that have enough resources due to a bottleneck caused by the ongoing live-migration of a first virtual machine, resources may be utilized efficiently in each of servers. In this way, according to the embodiment, live-migrations may be executed efficiently on a plurality of virtual machines.

Next, description will be given of a virtual machine controller and servers according to a first embodiment.

Figure 2:
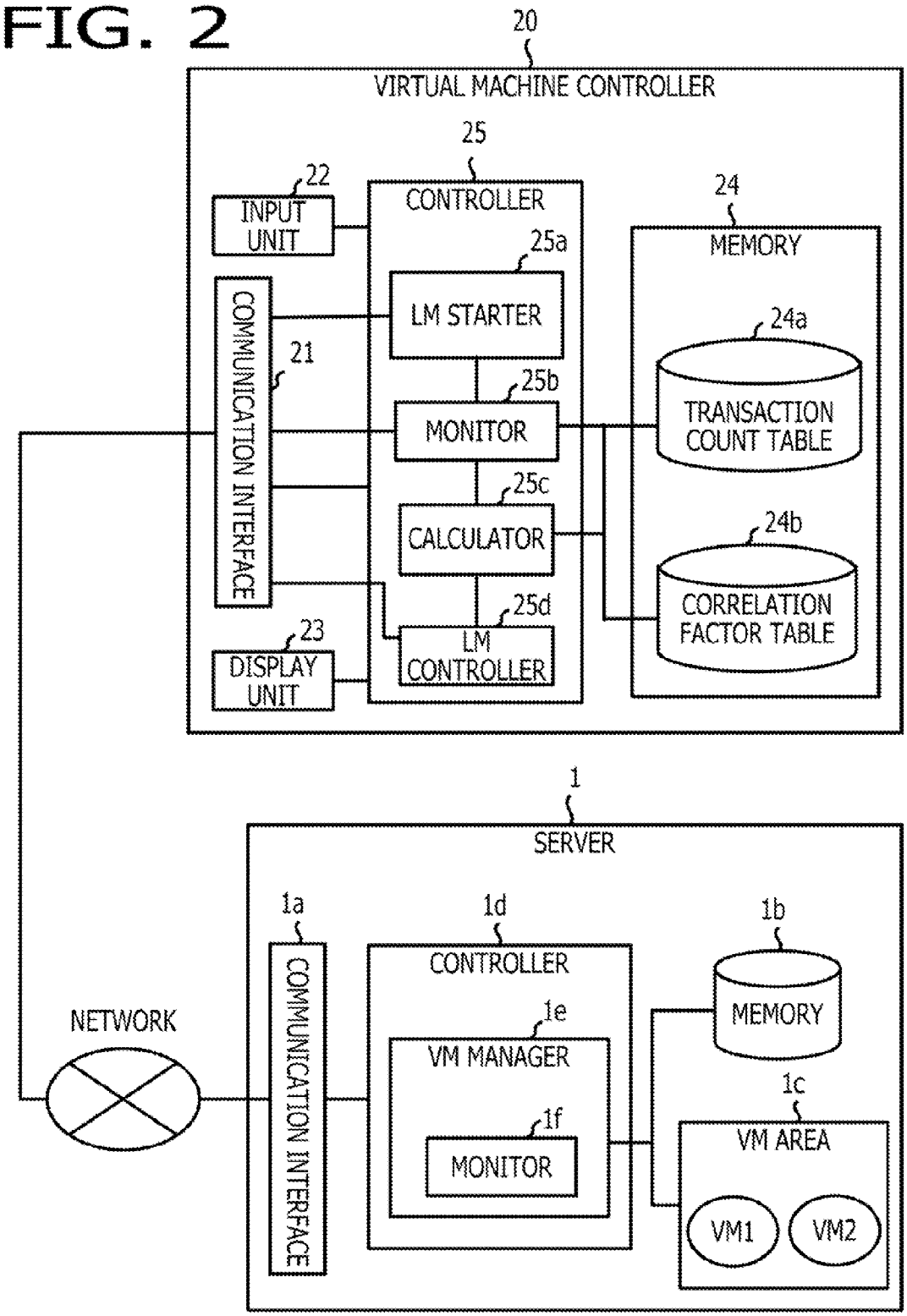
FIG. 2 is a diagram illustrating configuration examples of a virtual machine controller and a server, according to a first embodiment.

FIG. 2 is a diagram illustrating configuration examples of a virtual machine controller and a server, according to a first embodiment. Since each of servers depicted in FIG. 1 may be configured in the same manner, description will be given of server 1 as a representative configuration of a server.

As depicted in FIG. 2, server 1 may be configured to include, for example, communication interface 1a, memory 1b, VM area 1c, and controller 1d. Here, components depicted in FIG. 2 are examples, and a configuration according to the first embodiment will not be limited thereto. For example, server 1 may be configured to include devices such as a keyboard, a mouse, and a display.

Communication interface 1a serves as an interface for controlling communications with other devices. For example, communication interface 1a receives a command for starting a live-migration (a LM start command), from virtual machine controller 20, and performs transmission of contents of VM memory when executing the live-migration.

Memory 1b stores programs and data that are needed for various pieces of processing performed by controller 1d which will be described later, and may be implemented as a storage device such as a semiconductor memory element or a hard disk. For example, memory 1b stores information on a virtual machine, such as a virtual machine identifier, running state information (for example, a memory information and register information), or virtual machine image data. VM area 1c is an area for operating a plurality of virtual machines generated by controller 1d, and allows an arbitrary number of virtual machines to be operated therein. In the example depicted in FIG. 2, VM1 and VM2 are being operated in VM area 1c.

Controller 1d may be implemented as an electronic circuit such as a CPU (Central Processing Unit). Controller 1d has an internal memory that stores a control program such as an OS, programs defining various procedures, and required data. Controller 1d further includes VM manager 1e that performs a various pieces of processing.

VM manager 1e serves as a controller that performs various controls for a virtual machine, such as generation, removal, starting, and stopping of the virtual machine, and includes monitor 1f. For example, upon receiving a VM-generating command, VM manager 1e generates a virtual machine in VM area 1e, and starts up the generated virtual machine in VM area 1c. Upon receiving a VM-removal command, VM manager 1e removes the virtual machine from VM area 1c. Further, upon receiving a live-migration (LM) start command from virtual machine controller 20, VM manager 1e starts a live-migration of a virtual machine designated by the received LM start command.

Here, description will be given of a live-migration. A live-migration means transferring a virtual machine being operated in a server to a destination server while operating the virtual machine. When executing a live-migration on a virtual machine running in a server to a destination server, VM manager 1e copies, out of all pieces of running state information, first pieces of running state information that are currently not being used by the virtual machine, to the destination server without suspending the virtual machine. Here, the running state information may include memory information and register information (for example, a program counter value). Thereafter, each time second pieces of running state information that have been used by the virtual machine are released, VM manager 1e copies the released second pieces of running state information to the destination server without suspending the virtual machine. In this way, VM manager 1e repeatedly copies the second pieces of running state information that have been used by the virtual machine to the destination server without suspending the virtual machine. And, when the amount of third pieces of running state information that have remained without being copied to the destination server becomes less than a predetermined value, VM manager 1e suspends the virtual machine, and copies the remained third pieces of running state information that have not been copied yet to the destination server. Then, VM manager 1e sends a VM-start command to the destination server so as to start up the copied virtual machine within the destination server. Thus, VM manager 1e is able to execute a live-migration on a virtual machine using the method mentioned above. Here, the above mentioned method is one of examples, and the embodiments are not limited to this.

Monitor 1f collects resource-usage state information for each of a plurality of virtual machines being operated within VM area 1c, and sends the collected resource-usage state information to virtual machine controller 20. For example, monitor 1f may be configured to collect, as resource-usage state information, a time-sequence of transaction counts each indicating the number of transactions processed per unit time by each of virtual machines, or a time-sequence of usage rates of a virtual CPU allocated to the each of virtual machines. Then monitor 1f transmits the collected resource-usage state information to virtual machine controller 20.

For example, monitor 1f may be configured to collect resource-usage state information for a virtual machine on a permanent basis, for example, at predetermined intervals after the operation of the virtual machine has been started. It is also possible to configure monitor 1f so that monitor 1f starts collection of resource-usage state information after receiving a LM-start command for starting a live-migration. Further, monitor 1f may be configured to transmit resource-usage state information collected for each of a plurality of virtual machines to virtual machine controller 20 at regular intervals, or upon receiving a LM-start command for starting a live-migration. Further, it is also possible to configure monitor 1f so that monitor 1f transmits resource-usage state information every time the resource-usage state information have been collected after receiving a request command for requesting collection of resource-usage state information, from virtual machine controller 20.

As illustrated in FIG. 2, virtual machine controller 20 may be configured to include communication interface 21, input unit 22, display unit 23, memory 24, and controller 25. Here, components depicted in the example of FIG. 2 are examples, and a configuration of virtual machine controller 20 is not limited thereto.

Communication interface 21 serves as an interface for controlling transmission to apparatuses other than virtual machine controller 20. For example, communication interface 21 receives resource-usage state information for virtual machines, from each of servers, and transmits a LM-execution command for executing a live-migration to each of the servers.

Input unit 22 may be implemented as a device such as a keyboard or a mouse. Input unit 22 receives a LM-start command for starting a live-migration, for example, from a system manager, and sends the received command to controller 25. Display unit 23 may be implemented as a device such as a monitor or a speaker. Display unit 23 displays, for example, correlation factors calculated by controller 25 and the result of the executed live-migration.

Memory 24 may be implemented as a storage device such a semiconductor memory element or a hard disk. Memory 24 stores programs and data that are used for various pieces of processing performed by controller 25. For example, memory 24 stores an IP address of a server to be controlled by virtual machine controller 20 in association with a virtual machine that is to be executed by the server. Memory 24 further includes transaction count table 24a and correlation factor table 24b.

Transaction count table 24a stores, for example, resource-usage state information collected by monitor 25b of controller 25. As resource-usage state information, a time-sequence of transaction counts may be used where a transaction count indicates the number of transactions processed per unit time by each of a plurality of virtual machines.

FIG. 3 is a diagram illustrating an example of a transaction count table, according to an embodiment. As illustrated in FIG. 3, transaction count table 24a stores a time-sequence of transaction counts in association with each of a plurality of virtual machines, where a transaction count indicates the number of transactions processed per time unit by the each of virtual machines. A time-sequence of transaction counts may be acquired by collecting transaction counts at each of a predetermined sequence of times after a live-migration of a first virtual machine has been started.

In the example of FIG. 3, the time column indicates a sequence of times at which a transaction count is collected. Each entry of column VMi (i=1 to 6) indicates a transaction count, that is, the number of transactions processed per time unit by VMi at the corresponding time of the time column. In the example of FIG. 3, VM1 to VM6 are depicted as a plurality of virtual machines, and the acquired time-sequence of transaction counts is depicted in each of columns VM1 to VM6. However, the number of a plurality of virtual machines is not limited thereto. For example, when virtual machines VM1 to VM10 are being operated, a time-sequence of transaction counts is stored in transaction count table 24a in association with each of VM1 to VM10.

The example depicted in FIG. 3 illustrates that transaction counts of VM1, VM2, VM3, VM4, VM5, VM6 are 55, 50, 76, 65, 59, 32, respectively, at time 0 at which the relevant servers started to collect transaction counts for each of VM1 to VM6.

In the example of FIG. 3, time 1 indicates an elapsed time of 1 second from the time 0 at which the relevant servers started to collect transaction counts, and transaction counts of VM1, VM2, VM3, VM4, VM5, VM6 are 62, 56, 77, 56, 64, 38, respectively.

Further, time 7 indicates an elapsed time of 7 seconds from the time 0 at which the relevant servers started to collect transaction counts, and transaction counts of VM1, VM2, VM3, VM4, VM5, VM6 are 22, 18, 81, 94, 97, 41, respectively.

Here, description returns to FIG. 2. Correlation factor table 24b stores correlation factors calculated by calculator 25c of controller 25. Here, a correlation factor indicates a degree of correlation between first resource-usage state information for a first virtual machine and second resource-usage state information for each of one or more target virtual machines other than the first virtual machine where the first virtual machine (first VM) means a virtual machine of which a live-migration has been first executed and is ongoing.

FIG. 4 is a diagram illustrating an example of a correlation factor table, according to an embodiment. As depicted in FIG. 4, correlation factor table 24b stores a correlation factor in association with a pair of a first virtual machine and each of one or more target virtual machines other than the first virtual machine, of which a live-migration has not been started yet and is to be executed.

The example of FIG. 4 illustrates that when a live-migration of VM1 has been started, correlation factors for pairs of pieces of resource-usage state information corresponding (VM1, VM2), (VM1, VM3), and (VM1, VM4), are 0.84, −0.31, and −0.99, respectively.

In the similar way, when a live-migration of VM2 has been started, correlation factors for pairs of pieces of resource-usage state information corresponding to (VM2, VM1), (VM2, VM3), and (VM2, VM4), are 0.85, −0.34, and −0.95, respectively.

Controller 25 may be implemented as an electronic circuit such as a CPU. Controller 25 may have an internal memory for storing a control program such as an OS, programs defining various procedures, and required data. Controller 25 may further include LM starter 25a, monitor 25b, calculator 25c, and LM controller 25d, thereby performing a various pieces of processing.

LM starter 25a starts a live-migration of each of a plurality of virtual machines. For example, when a live-migration (LM) start command has been received via input unit 22, LM starter 25a sends a live-migration (LM) executing command to server 1 capable of operating VM1. LM starter 25a may be configured to coordinate a schedule for live-migrations, and to issues a live-migration executing command by determining automatically a time at which the live-migration is to be started, without receiving a live-migration start command, for example, from a system manager.

When a live-migration of a virtual machine has been started by LM starter 25a, monitor 25b acquires resource-usage state information for the first virtual machine of which the live-migration has been started, together with resource-usage state information for each of one or more target virtual machines other than the first virtual machine that are currently being operated. Here, as resource-usage state information, a time-sequence of transaction counts may be used, and monitor 25b stores the acquired resource-usage state information (time-sequences of transaction counts) in transaction count table 24a. For example, when a live-migration of a first virtual machine has been started, monitor 25a sends a transaction count acquiring request to each of servers using IP addresses of the servers that are stored in memory 24, and acquires, as resource-usage state information, a time-sequence of transaction counts for each of a plurality of virtual machines.

In the case of a system depicted in FIG. 1, when a live-migration of VM1 (a first virtual machine) is started, monitor 25b sends a transaction count acquiring request to each of servers 1 to 4, and receives a time-sequence of transaction counts for each of VM1 to VM6. In the case, monitor 25b may be configured to request for a time-sequence of transaction counts collected at times during a predetermined time period including a live-migration start-time of VM1. For example, monitor 25b may be configured to request for a time-sequence of transaction counts collected at times during a time period from five minutes before the migration start-time of VM1 to five minutes after the migration start-time of VM1. That is, for example, when a live-migration of VM1 has been started at 12:00, monitor 25b may acquire a time-sequence of transaction counts that were collected at times during the time period from 11:55 to 12:05. Thereafter, monitor 25b stores the acquired time-sequence of transaction counts in transaction count table 24a in association with each of VM1 to VM6, and, at the same time, monitor 25b sends the acquired time-sequence of transaction counts to calculator 25c.

Calculator 25c calculates correlation factors of resource-usage state information between a first virtual machine on which a live-migration has been started previously and each of one or more target virtual machines other than the first virtual machines, using the resource-usage state information acquired by monitor 25b. Here, a correlation factor indicating a degree of correlation between first resource-usage state information for the first virtual machine and second resource-usage state information for each of one or more target virtual machines other than the first virtual machine. In this case, for example, a time-sequence of transaction counts collected by a virtual machine is used as resource-usage state information for the virtual machine. Therefore, the correlation factor indicates a degree of correlation between a first time-sequence of transaction counts collected for the first virtual machine and a second time-sequence of transaction counts collected for each of the one or more target virtual machines other that the first virtual machine. Thereafter, calculator 25c stores the calculated correlation factors into correlation factor table 24b, and notifies LM controller 25d of the completion of calculating the correlation factors.

For example, when a first live-migration of VM1 is started, calculator 25c calculates correlation factors between pairs of time-sequences of transaction counts for VM1 and VM2, for VM1 and VM3, for VM1 and VM3, for VM1 and VM4, for VM1 and VM5, and for VM1 and VM6, respectively.

In the case, for example, calculator 25c calculates a correlation factor "Cc" using the following formulas (1) and (2).

$$Cc = Cov(X,Y)/\delta_x \cdot \delta_y \quad \text{Formula (1)}$$

$$Cov(X, Y) = \frac{1}{n}\sum_{j=1}^{n}(x_j - u_x)(y_j - u_y) \quad \text{Formula (2)}$$

In formulas (1) and (2), "X" indicates a first time-sequence of n transaction counts for a first virtual machine of which a live-migration has been started previously, and "Y" indicates a second time-sequence of n transaction counts for a target virtual machine of which a live-migration is to be performed. In formula (2), "$x_j$" indicates jth transaction count within X (the first time-sequence of n transaction counts), and "$y_j$" indicates jth transaction count within Y (the second time-sequence of transaction counts).

Further, "Cov(X,Y)" indicates a covariance value between X and Y, $\delta_x$ indicates a standard deviation for X, $\delta_y$ indicates a standard deviation for Y, $u_x$ indicates an arithmetic average for X, and $u_y$ indicates an arithmetic average for Y.

Here, description will be given of an example calculating a correlation factor between a pair of time-sequences of transaction counts for VM1 and VM2 when a first live-migration of VM1 (a first virtual machine) has been started at time 5 of FIG. 3. In the case, times 1 to 10 of FIG. 3 correspond to times during a time period from five minutes before the live-migration start-time of the first virtual machine to five minutes after the live-migration start-time, and n becomes 10. X indicates a first time-sequence of transaction counts for VM1 (the first virtual machine): 55, 62, 51, 54, 53, 24, 18, 22, 21, 23, and 30. Y indicates a second time-sequence of transaction counts for VM2 (the second virtual machine): 50, 56, 61, 51, 54, 50, 23, 18, 22, 21, and 24. Here, an arithmetic average and a standard deviation may be calculated using a known method available for general use.

LM controller 25d identifies a virtual machine having a positive correlation factor that was calculated by calculator 25c, as a second virtual machine on which a live-migration is to be performed in parallel with the ongoing live-migration of the first virtual machine (VM1). Here, the positive correlation factor means that there exists a close similarity between the first and second time-sequences of transaction counts.

For example, it is assumed that, when a live-migration of VM1 has been started, correlation factors between a time-sequence of transaction counts for VM1 that was calculated by calculator 25c and a time-sequence of transaction counts for each of the other VMs (target virtual machines) are as illustrated in the first row of FIG. 4. In the case, LM controller 25d identifies VM2 that has correlation factor 0.82 closest to 1 among the correlation factors in the first row of FIG. 4. Then, LM controller 25d determines VM2 to be a second virtual machine on which a live-migration is to be performed in parallel with the ongoing live-migration of VM1 that has been started previously. Thereafter, LM controller 25d identifies server 1 that is currently executing VM2, and the IP address of servers 1, by referring to a memory 24, and sends to server 1 a command for executing a live-migration that migrates VM2 to server 3.

As a result, server 1 executes a live-migration that transfers VM2 to server 3 while executing the live-migration of VM1. Here, LM controller 25d may be configured to independently determine a target server to which a virtual machine is to be migrated. For example, LM controller 25d may be configured to determine a server having a smaller resource-usage rate, such as a smaller CPU utilization ratio, to be the target server.

Next, description will be given of a degree of correlation between resource-usages, using a specific example indicating a dependency relationship among a plurality of virtual machines.

Figure 5:
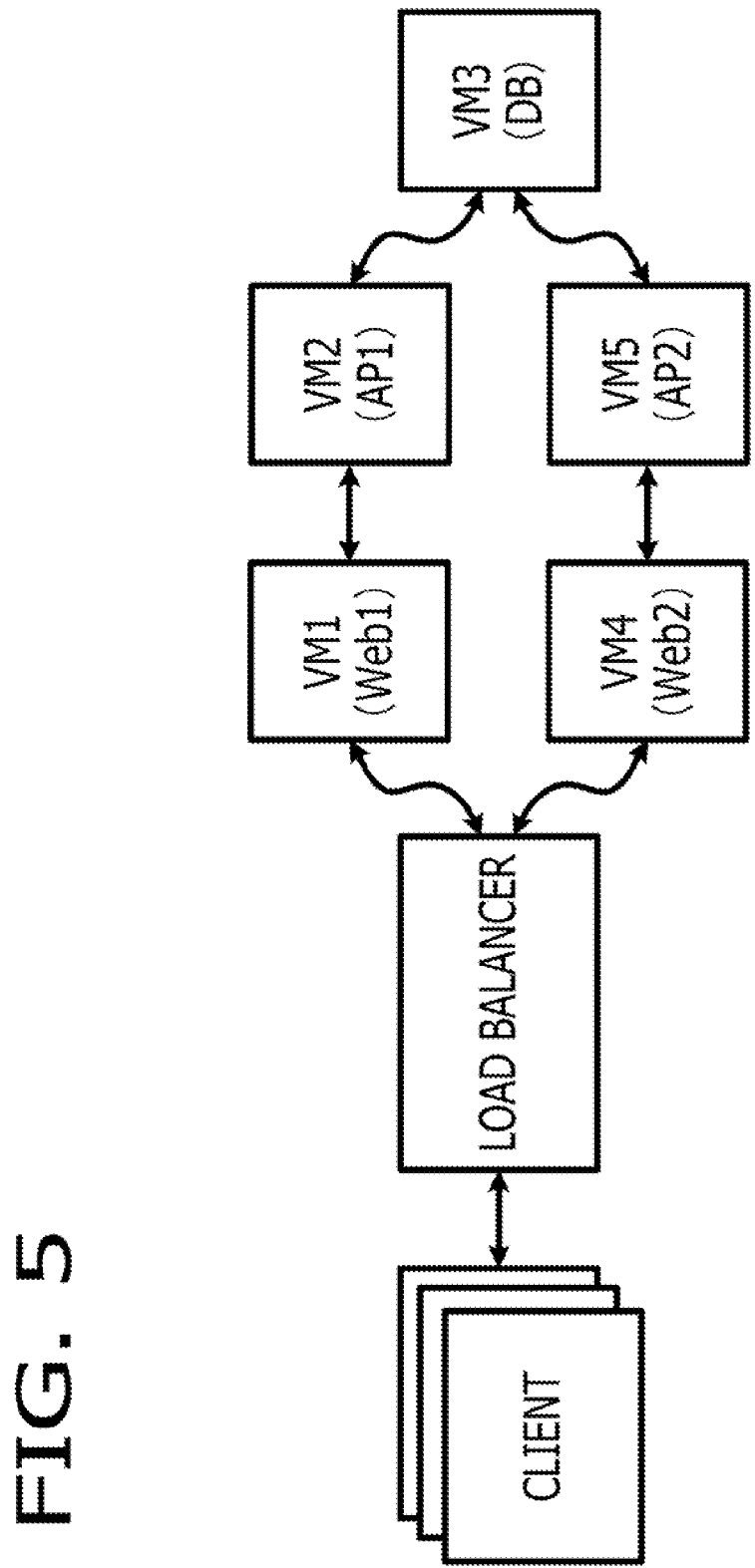
FIG. 5 is a schematic diagram illustrating an example of a dependency relationship among a plurality of virtual machines.

FIG. 5 is a schematic diagram illustrating an example of a dependency relationship among a plurality of virtual machines.

Figure 6:
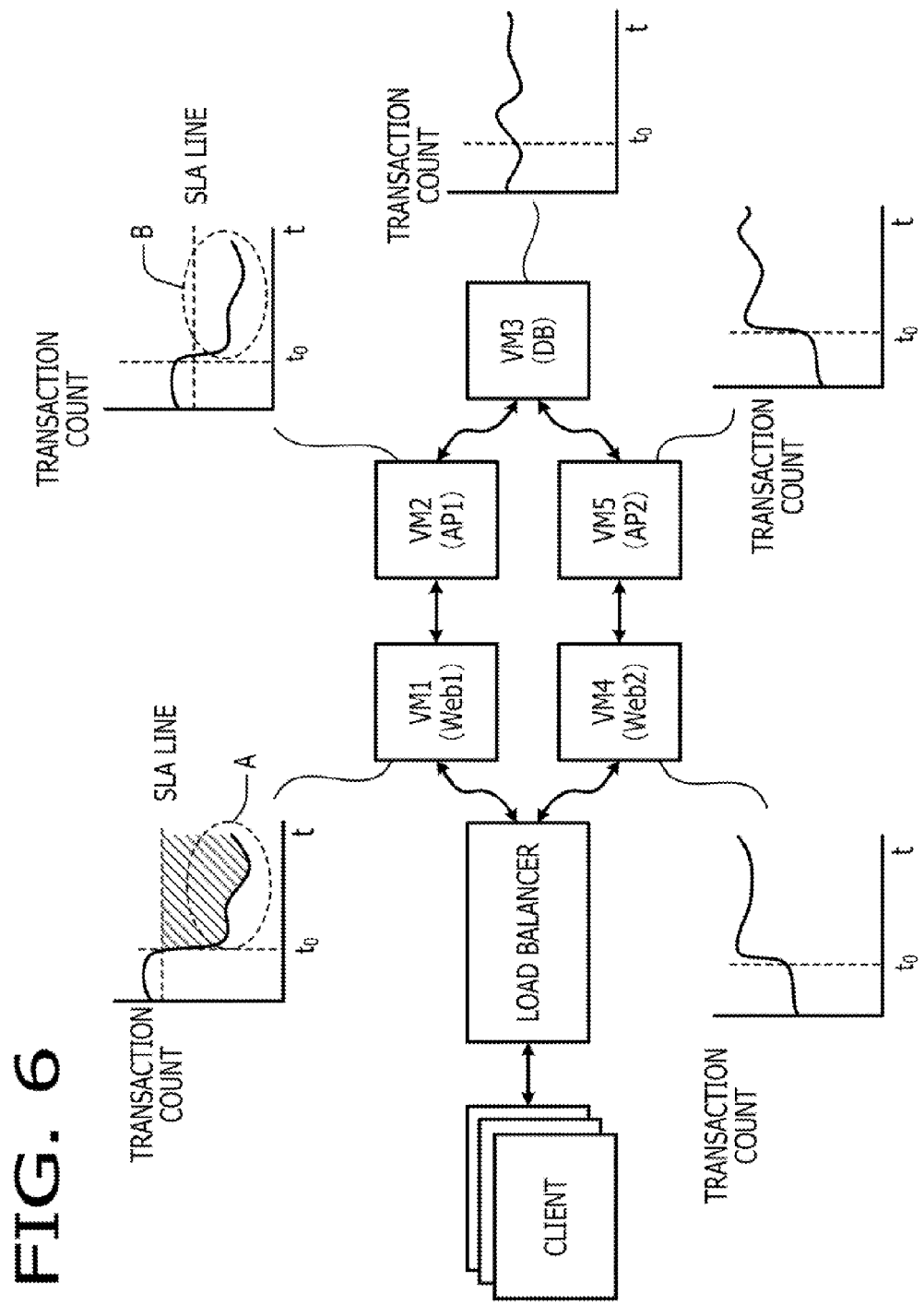
FIG. 6 is a schematic diagram illustrating an example of a change in a transaction count for a second virtual machine after starting a live-migration of a first virtual machine.

FIG. 6 is a schematic diagram illustrating an example of a change in a transaction count for a second virtual machine after starting a live-migration of a first virtual machine.

Figure 7:
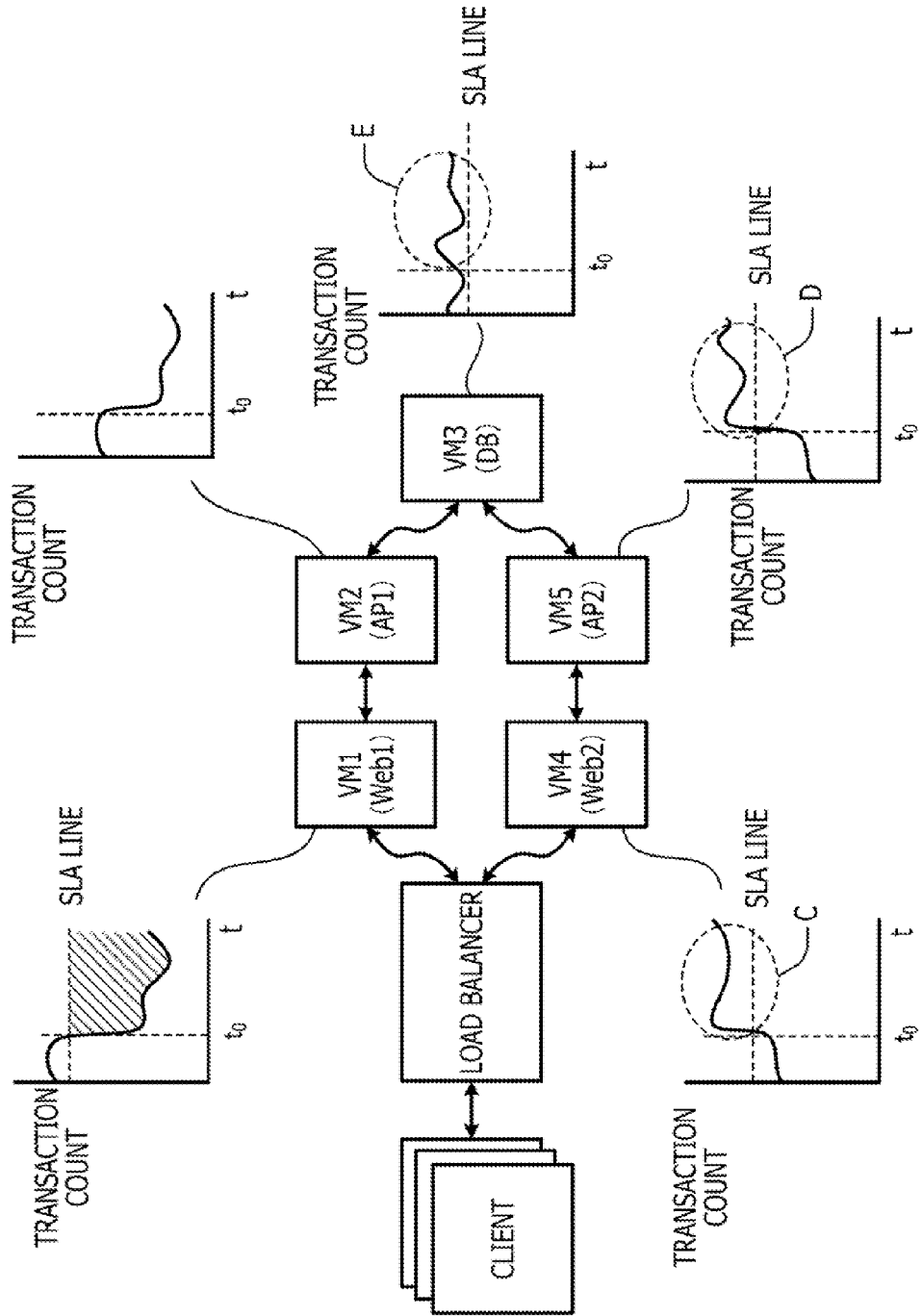
FIG. 7 is a schematic diagram illustrating an example of a change in a transaction count for each of target virtual machines other than a second virtual machine.

FIG. 7 is a schematic diagram illustrating an example of a change in a transaction count for each of target virtual machines other than a second virtual machine.

Figure 8:
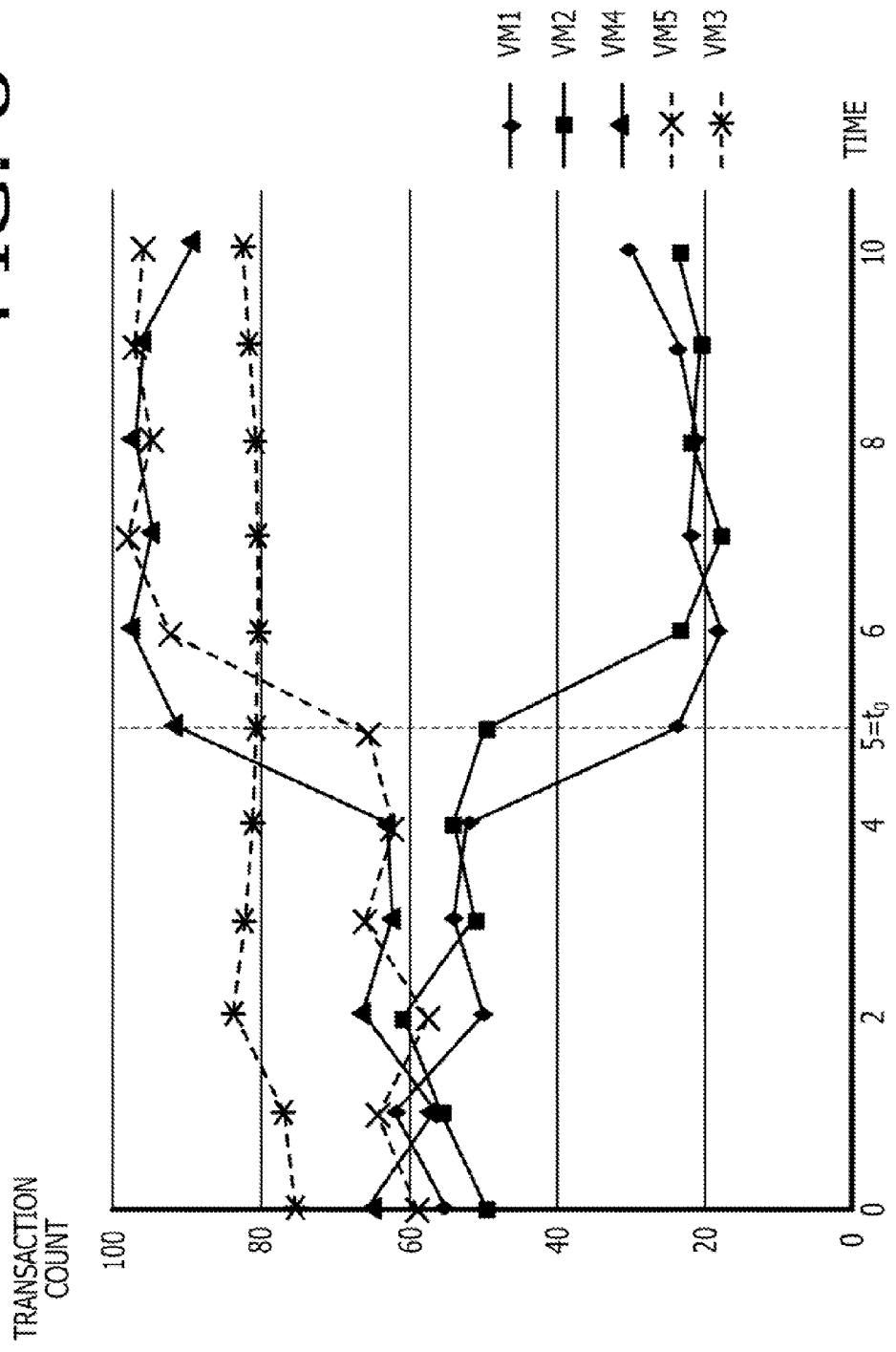
FIG. 8 is a diagram illustrating an example of a graph representing a time-sequence of transaction counts for each of a plurality of virtual machines.

FIG. 8 is a diagram illustrating an example of a graph representing a time-sequence of transaction counts for each of a plurality of virtual machines.

Here, description will be given of an example in which VM1 to VM5 form a three-layered system of Web-AP (Application)-DB (Database), as depicted in FIG. 5. VM1 and VM4 are virtual machines for providing Web services. VM2 is a virtual machine for realizing an AP server that is configured to acquire, upon receiving a request from VM1, various pieces of data from VM3 to respond to VM1. Likewise, VM5 is a virtual machine for realizing an AP server that is configured to acquire, upon receiving a request from VM4, various pieces of data from VM3 to respond to VM4. VM3 is a virtual machine for realizing a database server that is configured to store various pieces of information to be used for the system.

In FIGS. 5 to 7, although a virtual machine controller is not depicted, it is assumed that the virtual machine controller is communicably coupled to servers in which the above mentioned virtual machines are running. Here, virtual machines may be implemented in one cabinet or in dispersed cabinets. Further, for example, VM1 and VM2 may be implemented in the same cabinet. In this way, the number of physical machines on which virtual machines are being operated may be set at an arbitrary value.

In the example of FIG. 5, for example, a HTTP (Hypertext Transfer Protocol) request is distributed to VM1 or VM4 by a load balancer. Upon receiving HTTP requests, VM1 and VM4 perform respective applications provided for VM2 and VM5, to connect with VM3. Further, VM1 or VM4 acquires various pieces of data from VM3, and transmits, as responses for the HTTP request, the acquired data to a client.

In the example of FIG. 5, for example, a SLA (Service Level Agreement) is concluded between a provider and each of users with respect to usage of a virtual machine, and the SLA is being observed by both the provider and the users. The SLA requires, for example, that the number of transactions to be processed per time unit (a transaction count) should be equal to or greater than a predetermined value. In the case, the SLA will be breached when the transaction count becomes less than the predetermined value. Enterprises that manage the system depicted in FIG. 5 perform managements of virtual machines and physical machines so as not to violate the SLA.

Next, description will be given of an example in which live-migrations of VM1 to VM5 are executed in the above mentioned situation, with reference to FIGS. 6 and 7. First, virtual machine controller 20 receives a LM-start command for starting a live-migration of VM1, from a system manager. Then, virtual machine controller 20 sends the LM-executing command for VM1 to a server that is expected to operate VM1. Thereafter, the live-migration is started. Here, let $t_0$ be a time at which the live-migration of VM1 was started.

When the live-migration of VM1 is started, in VM1, resources are consumed to execute the live-migration thereof, and the remaining resources usable for providing a service may be reduced, thereby decreasing a transaction count for VM1 (the number of transactions processed per unit time by VM1) as depicted in FIG. 6 (see A in FIG. 6). Consequently, the number of transactions to be processed by VM1 decreases, which then decreases the number of transactions processed per time unit by VM2 positioned at a processing stage subsequent to VM1 (see B in FIG. 6). For example, since VM2 is a virtual machine for processing transactions requested from VM1, the number of transactions processed per unit time by VM2 decreases with decreasing the number of transactions requested from VM1. That is, the number of transactions processed per unit time by VM2 decreases due to a bottleneck caused by decrease in the number of transactions processed per unit time by VM1.

Meanwhile, when it is assumed that the number of transactions requested from clients do not decrease even after the live-migration of VM1 has been started, a load balancer distributes a larger amount of transactions to VM4 rather than to VM1 in which the number of transactions capable of being processed per unit time has been decreased. Therefore, the transaction count for VM4 increases after time $t_0$ at which the live-migration of VM1 was started (as illustrated by C in FIG. 7). In the similar manner, since the number of transactions processed per unit time by VM4 increases, the number of transactions processed per unit time by VM5 that is positioned at a processing stage subsequent to VM4 also increases (see D in FIG. 7). In the case, since the total number of transactions requested per unit time does not decrease even after the live-migration of VM1 was started, the number of transactions processed per unit time by VM3 may not change greatly.

Accordingly, as depicted in FIG. 8, until time $t_0$ (=5) at which the live-migration of VM1 was started, a large difference is not found between a pair of transaction counts for VM1 and VM4, as well as between a pair of transaction counts for VM2 and VM5. However, after time $t_0$ (=5) at which the live-migration of VM1 was started, transaction count for VM2 decreases with decreasing a transaction count for VM1. Meanwhile, with decreasing a transaction count for VM1, a transaction count for VM4 increases, thereby increasing a transaction count for VM5.

In the case mentioned above, with respect to a time-sequence of transaction counts that were collected, for each of a plurality of virtual machines, before and after the live-migration start-time of the first virtual machine (VM1), a virtual machine controller calculates a positive correlation factor (meaning a close similarity) for between VM1 and VM2, calculates a negative correlation factor (meaning a weak correlation) for between VM1 and VM4, calculates a negative correlation factor for between VM1 and VM5, and calculates a negative correlation factor for between VM1 and VM3.

In this way, calculating correlation factors allows a virtual machine controller to identify a second virtual machine (in this case, VM2) for which the transaction count has decreased in tandem with a transaction count for the first virtual machine (VM1). Then, the virtual machine controller executes a live-migration on the identified second virtual machine (VM2) in parallel with the live-migration of the first virtual machine (VM1). That is, the virtual machine controller executes a live-migration on a second virtual machine that has a margin for resource usage rate due to decrease in transaction count caused by the bottleneck of decreased transaction count for the first virtual machine.

Next, description will be given of an operational flowchart performed by a virtual machine controller.

Figure 9:
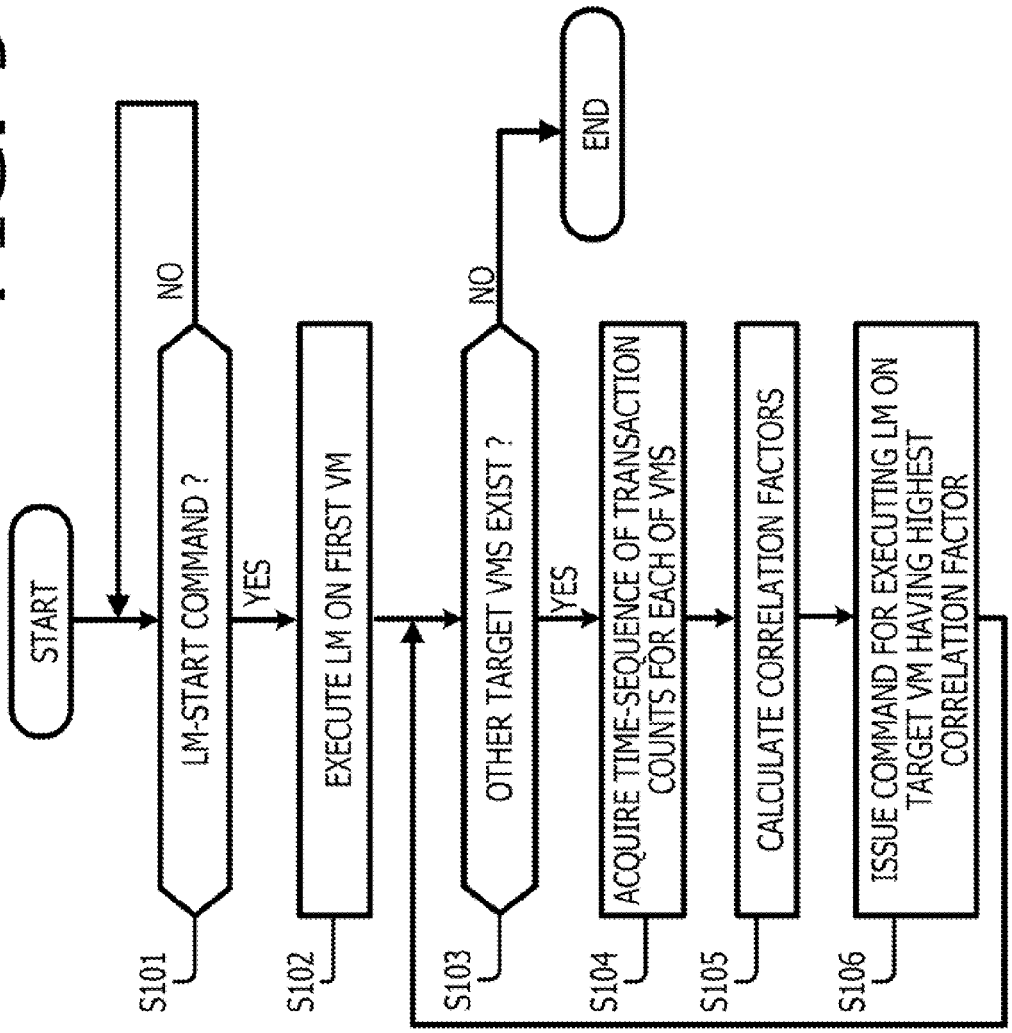
FIG. 9 is a diagram illustrating an example of an operational flowchart performed by a virtual machine controller, according to a first embodiment.

FIG. 9 is a diagram illustrating an example of an operational flowchart performed by a virtual machine controller, according to a first embodiment. In FIG. 9, for ease of explanation, live-migration will be expressed as "LM", and virtual machine will be expressed as "VM".

In operation S101, LM starter 25a of virtual machine controller 20 waits for receiving a live-migration (LM) start command. Upon receiving LM start command (YES in operation S101), LM starter 25a starts a live-migration of a first virtual machine designated by the LM start command (in operation S102). Hereinafter, a time at which a live-migration of the first virtual machine is started will be also expressed as "a LM start time".

In operation S103, monitor 25b determines whether there exist one or more target virtual machines other than the first virtual machine, of which live-migrations are to be executed. When it is determined that there exist the one or more target virtual machines (YES in operation S103), monitor 25b acquires a time-sequence of transaction counts for each of the on or more target virtual machines by collecting the relevant transaction counts from a physical server (in operation S104). Here, monitor 25b may be configured to acquire a time-sequence of transaction counts collected at times, for example, during a time period from five minutes before the LM start time to five minutes after the LM start time. When it is determined that there exist no other virtual machines left on which live-migrations are to be executed (NO in operation S103), the processing is ended.

In operation S105, calculator 25c calculates a correlation factor indicating a correlation between a first time-sequence of transaction counts for a first virtual machine of which a live-migration has been started previously and a second time-sequence of transaction counts for each of one or more target virtual machines other than the first virtual machine, using a time-sequence of transaction counts acquired, by monitor 25b, for each of the one or more target virtual machines.

In operation S106, LM controller 25d identifies a virtual machine having the greatest positive correlation factor with respect to the first virtual machine, among the one or more target virtual machines, as a second virtual machine of which a live-migration is to be performed in parallel with the ongoing live-migration of the first virtual machine, and issues a command for executing a live-migration on the identified second virtual machine.

Thereafter, virtual machine controller 20 may wait for the completion of two ongoing live-migrations of the first and second virtual machines, or may repeat the sequence of operations S003 to S106.

According to the above first embodiment, when a live-migration of the first virtual machine (VM1) is started, virtual machine controller 20 acquires, as resource-usage state information, a time-sequence of transaction counts for VM1 and for each of the other target VMs (VM2 to VM6). Virtual machine controller 20 calculates correlation factors between first resource-usage state information (in the case, time-sequences of transaction counts) for VM1 and second resource-usage state information for each of VM2 to VM6. Virtual machine controller 20 executes a live-migration on a second virtual machine that is selected from the other target VMs (VM2 to VM6) and has a positive correlation factor with respect to the first virtual machine, while executing the live-migration of the first virtual machine, thereby efficiently executing live-migrations on the plurality of virtual machines.

Further, according to the first embodiment, a transaction count for the second virtual machine decreases due to a bottleneck caused by the first virtual machine that is executing the live-migration thereof, meaning that the resource usage rate of the second virtual machine is reduced. Then, the live-migration of the second virtual machine is executed using surplus resources that are acquired due to the reduction in the resource usage rate of the second virtual machine. As a result, live-migrations are concurrently executed on a plurality of virtual machines without lowering a service level.

In the above mentioned case, SLA on the second virtual machine (VM2) may be breached due to the bottleneck of the first virtual machine (VM1). However, according to the first embodiment, since surplus resources of the second virtual machine that are acquired due to reduction in the transaction count for the second virtual machine are used for a live-migration of the second virtual machine, possibility for breaching the SLA may be reduced. Further, because a plurality of virtual machines are migrated concurrently, the total sum of virtual machine migration times is reduced, thereby decreasing the number of times of breaching the SLA.

Formerly, an operation manager planned to perform live-migrations during a time period in which a resource usage rate is low, such as early morning, so as to avoid degradation of a service level to be provided by a user virtual machine. Using the above mentioned method allows the operation manager to facilitate planning of live-migrations on a plurality of virtual machines, thereby effecting a large reduction in cost and man-hours for the operation manager.

Further, according to the first embodiment, correlation factors are calculated based on change in transaction counts collected at times before and after a LM start time at which a live-migration of the first virtual machine was started. That is, correlation factors are calculated based on a change in the transaction counts that was caused by a live-migration, thereby allowing calculation of accurate correlation factors.

For example, in the example mentioned above, if correlation factors were calculated based on only transaction counts after the LM start time at which the live-migration of the first virtual machine was started, it would happen that a highly positive correlation factor is calculated with respect to a virtual machine in which the transaction count is reduced due to, for example, a system down or a hardware failure. However, using the transaction counts collected during a predetermined time period including times before and after the LM start time of the first virtual machine, a correlation factor is calculated based on a change in the transaction counts that was caused by the live-migration of the first virtual machine. This prevents a correlation factor being calculated as a highly positive value with respect to a virtual machine in which the transaction count is reduced due to, for example, a system down or a hardware failure.

As a second embodiment, a virtual machine controller may be configured to determine a second virtual machine by selecting, from among target virtual machines having high positive correlation factors, the second virtual machine of which a live-migration will be completed before completion of the ongoing live-migration of the first virtual machine. According to the second embodiment, a live-migration is executed on the second virtual machine of which the live-migration will complete before completion of the ongoing live-migration of the first virtual machine, while executing the live-migration of the first virtual machine.

For example, calculator 25c of virtual machine controller 20 calculates a transfer time needed for transferring each of a plurality of virtual machines, using a memory-rewriting rate (also called "a dirty rate") indicating a ratio of a memory-writing time to a unit time, where the memory-writing time indicates a time used for writing virtual machine data into a memory area for storing the virtual machine data when migrating each of the plurality of virtual machines. Then, calculator 25c identifies a second virtual machine that has a high positive correlation factor and is capable of completing a live-migration thereof before completion of the ongoing live-migration of the first virtual machine that has been previously started, based on the calculated transfer times.

For example, calculator 25c may calculate a transfer time for each of a plurality of virtual machines using the following formula (3).

$$\text{(Transfer time)} = \frac{(VM \text{ memory size})}{(LM \text{ bandwidth}) \times \{1 - (\text{Memory} - \text{rewriting rate})\}} \quad \text{Formula (3)}$$

In formula (3), (VM memory size) indicates the size of a memory being used by a virtual machine. (LM bandwidth) indicates a bandwidth available for a live-migration of the virtual machine. (memory-rewriting rate) indicates indicating a ratio of a memory-writing time to a unit time where the memory-writing time indicates a time used for writing virtual machine data into a memory area for storing the virtual machine data when migrating each of the plurality of virtual machines, and (memory-rewriting rate) is also called "a dirty rate".

(VM memory size) is managed by a physical server that operates the virtual machine, and is acquired from the physical server. (LM bandwidth) is beforehand set, for example, to virtual machine controller 20, and has a value constant for each of a plurality of virtual machines. A memory-rewriting rate (or a dirty rate) may be measured by each of servers.

For example, in the case of FIG. 1, when a live-migration of VM1 (a first virtual machine) is started, calculator 25c calculates a transfer time for each of VM1 to VM6. Then, calculator 25c selects at least one target virtual machine of which a transfer time is smaller than that of the first virtual machine (VM1). Thereafter, calculator 25c calculates a correlation factor indicating a degree of correlation between first resource-usage state information (for example, a pair of time-sequences of transaction counts) for the first virtual machine (VM1) and second resource-usage state information for each of the selected at least one target virtual machine, and identifies a second virtual machine having a positive correlation factor greatest among the selected at least one target virtual machine. Then LM controller 25d starts a live-migration on the identified second virtual machine.

Here, a processing order of calculating a transfer time and calculating a correlation factor may be exchangeable. For example, calculator 25c firstly selects target virtual machines each having a positive correlation factor with respect to the first virtual machine (VM1), and calculates transfer times for VM1 and for each of the selected target virtual machines. Then, LM controller 25d identifies a second virtual machine that requires a transfer time smaller than that of VM1 among the selected target virtual machines, and starts a live-migration of the identified second virtual machine.

Figure 10:
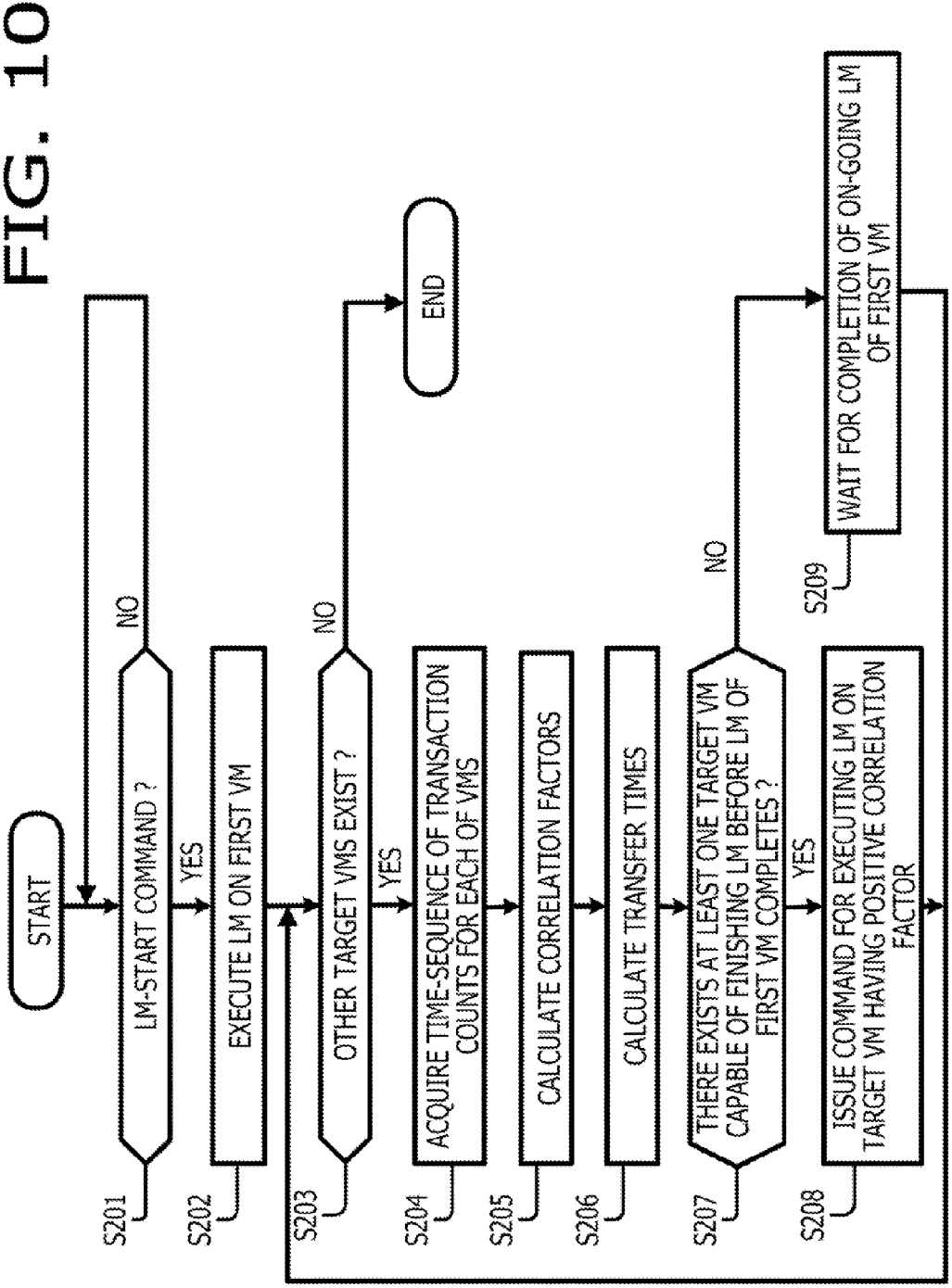
FIG. 10 is a diagram illustrating an example of an operational flowchart performed by a virtual machine controller, according to a second embodiment.

FIG. 10 is a diagram illustrating an example of an operational flowchart performed by a virtual machine controller, according to a second embodiment.

In operation S201, LM starter 25a of virtual machine controller 20 waits for receiving a live-migration (LM) start command. Upon receiving LM start command (YES in operation S201), LM controller 25a starts a live-migration of a first virtual machine designated by the received LM start command (in operation S202).

In operation S203, monitor 25b determines whether there exist other target virtual machines, that is, one or more target virtual machines of which a live-migrations are to be executed. When it is determined that there exists other target virtual machines (YES in operation S203), monitor 25b acquires, from physical servers, a time-sequence of transaction counts for each of a plurality of virtual machines (in operation S204). Here, monitor 25b acquires, from servers, "VM memory size" and "memory-rewriting rate" for each of the plurality of virtual machines. Further, monitor 25b acquires "LM bandwidth" that is beforehand set, for example, from a memory of virtual machine controller 20. Meanwhile, when it is determined that there exist no other target virtual machines (NO in operation S203), monitor 25b ends the processing.

In operation S205, calculator 25c calculates a correlation factor indicating a degree of correlation between first resource-usage state information for the first virtual machine of which a live-migration is ongoing and second resource-usage state information for each of other target virtual machines. In the case, for example, a time-sequence of transaction counts acquired by monitor 25b is used as resource-usage state information for each of the plurality of virtual machines.

In operation S206, calculator 25c calculates a transfer time for each of the plurality of virtual machines, by substituting, into formula (3), "VM memory size", "LM bandwidth", and "memory-rewriting rate" that are acquired by monitor 25b. In the case, calculator 25c may be configured to calculate transfer times for virtual machines having positive correlation factors, or to calculate transfer times for all the plurality of virtual machines.

In operation S207, calculator 25c determines whether there exists at least one target virtual machine of which live-migration has not been executed yet and of which the live-migration will complete before the completion of the live-migration of the first virtual machine. When calculator 25c determined that there exists the at least one target virtual machine (YES in operation S207), LM controller 25d identifies a third virtual machine that is selected from the at least one target virtual machine and has a positive correlation factor with respect to the first virtual machine. Then, LM controller 25d issues a LM executing command for executing a live-migration on the identified third virtual machine. Meanwhile, when calculator 25c determined that there exists no at least one target virtual machine of which live-migration has not been executed yet and of which the live-migration will complete before the completion of the live-migration of the first virtual machine (NO in operation S207), LM controller 25d waits for completion of the ongoing live-migration of the first virtual machine (in operation S209).

Thereafter, virtual machine controller 20 may wait for completion of the ongoing live-migrations, or may repeat a sequence of operations subsequent to operation S203.

According to a second embodiment, virtual machine controller 20 calculates, when a live-migration of a first virtual machine has been started, a transfer time for each of a plurality of virtual machines using a memory-rewriting rate indicating a memory rewriting time per unit time. Next, virtual machine controller 20 selects at least one target virtual machine capable of finishing live-migrations thereof before completion of the ongoing live-migration of the first virtual machine, using the calculated memory-rewriting rates. Virtual machine controller 20 identifies, from among the selected at least one target virtual machine, a third virtual machine that has a positive correlation factor with respect to the first virtual machine. Then, virtual machine controller 20 executes a live-migration on the identified third virtual machine in parallel with the ongoing live-migration of the first virtual machine so that the live-migration of the third virtual machine finishes before completion of the ongoing live-migration of the first virtual machine. This prevents a degradation of service level that may be caused when the live-migration of the third virtual machine has continued beyond the completion time of the ongoing live-migration of the first virtual machine.

The present invention may be applied to various embodiments other than those described above. Hereinafter, description will be given of other embodiments.

For example, although dependence relationships among virtual machines were described with reference to FIGS. 5 to 7, the dependence relationships among virtual machines are not limited to these relationships. A virtual machine controller according to an embodiment may be applied, in the similar manner, to a system configuration other than a three-layered system of Web-AP-DB as illustrated in FIG. 5.

In the embodiments 1 and 2, although description was given of the examples in which virtual machine controller 20 and servers are arranged in the same network, the arrangement of virtual machine controller 20 and servers is not limited to this. For example, a server in which virtual machines are operated and virtual machine controller 20 may be arranged in different networks, respectively. For example, virtual machine controller 20 and each of servers may be arranged in different LANs (Local Area Networks), and may be connected with each other via a network other than a LAN.

Further, virtual machine controller 20 may be configured to store correlation factors that were previously calculated, into correlation factor table 24b, and to use the correlation factors stored in correlation factor table 24b without newly calculating correlation factors when executing live-migrations subsequent to the ongoing live-migration of a first virtual machine. For example, when virtual machine controller 20 determines that processing patterns of a plurality of virtual machines and relationships among the plurality of virtual machines are unchanged by checking configuration information acquired from each of servers, virtual machine controller 20 uses the correlation factors stored in correlation factor table 24b. This eliminates a time required for calculating correlation factors, and allows live-migrations of a plurality of virtual machines to be executed at high speed.

It is also possible to perform manually whole or part of the processing that was described as being performed automatically in the embodiments. Further, whole or part of the processing that were described as being performed manually may be performed automatically using a known method. Furthermore, operational sequences, control sequences, illustrated labels, and pieces of information including various types of data and parameters, which are illustrated in FIGS. 1 to 10, may be changed arbitrarily, if not otherwise specified.

Further, components of apparatuses depicted in figures are illustrated conceptually or functionally, and are not required to be configured physically in the same manner as illustrated in the figures. For example, monitor 25*b* and calculator 25*c* may be integrated into one component, and specific configurations obtained by distribution and integration of components are not limited to those illustrated in the figures. In other words, whole or part of the components may be configured to be, functionally or physically, distributed or integrated with an arbitrary unit. As for processing that is performed by each apparatus, whole or part of the processing may be implemented as a CPU and a program that is analyzed and executed by the CPU, or may be implemented as a hardware in which a wired-logic is executed.

Various types of processing described in the above embodiments may be implemented by executing programs that are beforehand prepared on a computer system such as a personal computer and a work station. Hereinafter, description will be given of an example of a computer system that executes programs having functions similar to those described in the above embodiments.

Figure 11:
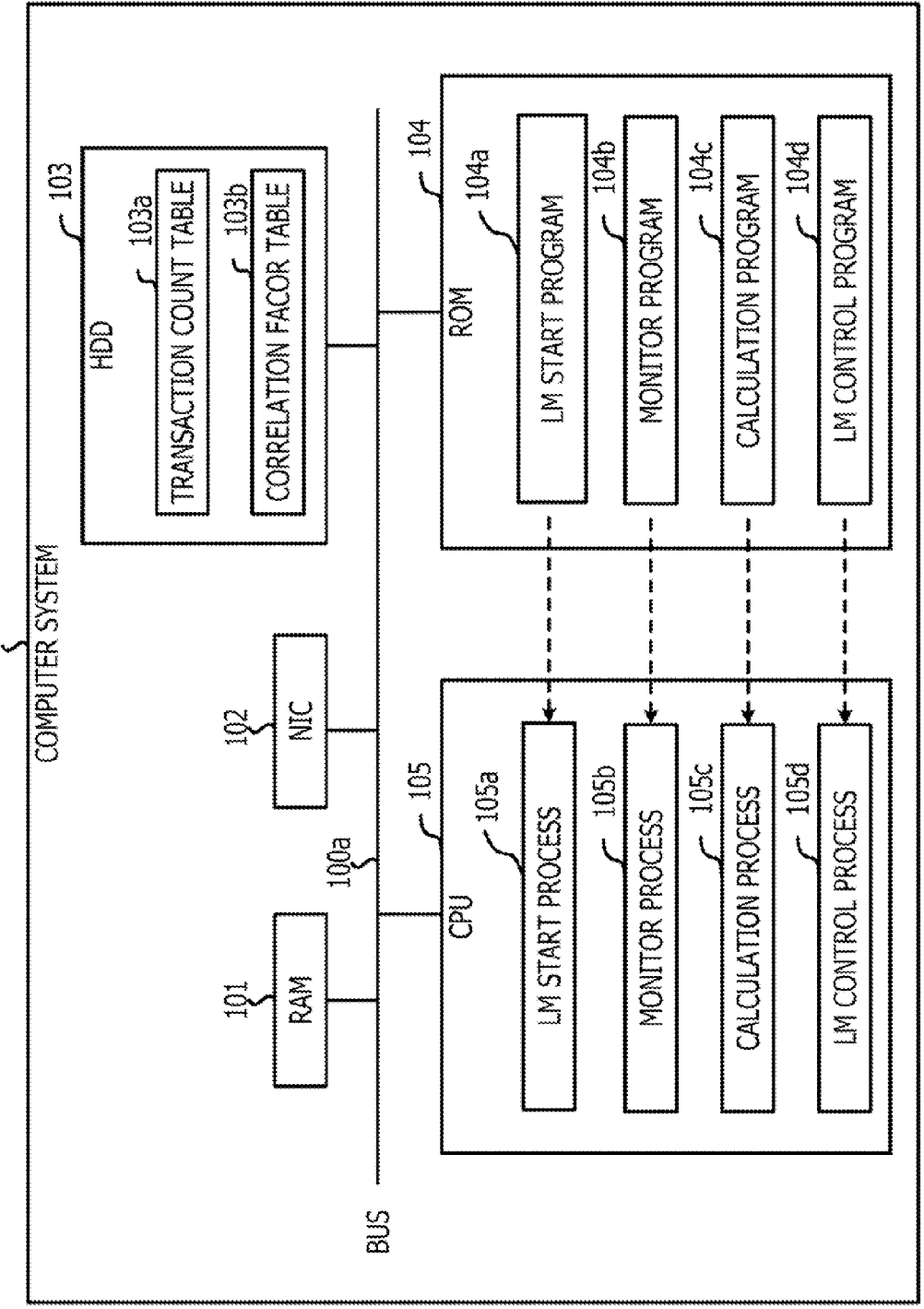
FIG. 11 is a diagram illustrating an example of a computer system that executes a virtual machine control program, according to an embodiment.

FIG. 11 is a diagram illustrating an example of a computer system that executes a virtual machine control program, according to an embodiment. As depicted in FIG. 11, computer system 100 may be configured to include CPU 105, ROM (Read Only Memory) 104, RAM (Random Access Memory) 101, and bus 100*a*, where CPU 105, ROM 104, RAM 101 are connected to bus 100*a*. Computer system 100 may further include NIC (Network Interface Card) 102, and HDD (Hard Disk Drive) 103 that are connected to bus 100*a*.

HDD 103 includes transaction count table 103*a* and correlation factor table 103*b* that correspond to transaction count table 24*a* and correlation factor table 24*b* of FIG. 2, respectively.

ROM 104 includes LM start program 104*a*, monitor program 104*b*, calculation program 104*c*, and LM control program 104*d*. Here, although ROM 103 is taken as an example of a tangible recording medium, other tangible computer readable recording media, such as a HDD, a RAM, and a CD-ROM, may be used for storing various types of programs so that a computer reads out the various types of programs. Further, tangible recording media may be positioned at a remote location, and a computer may acquire a program by accessing the tangible recording media so as to use the program. In the case, the computer may be configured to use the acquired program that is stored in a tangible recording medium provided for the computer.

CPU 105 may be configured to include LM start process 105*a*, monitor process 105*b*, calculation process 105*c*, and LM control process 105*d* that implement the functions equivalent to LM starter 25*a*, monitor 25*b*, calculator 25*c*, and LM controller 25*d*, as LM start process 105*a*, monitor process 105*b*, calculation process 105*c*, and LM control process 105*d*, respectively. Here, LM start process 105*a*, monitor process 105*b*, calculation process 105*c*, and LM control process 105*d* are executed by reading out and executing LM start program 104*a*, monitor program 104*b*, calculation program 104*c*, and LM control program 104*d*, respectively. In this way, each of various programs stored in ROM 104 functions as a part of the virtual machine control program, and computer system 100 serves as a virtual machine controller by reading out various programs from ROM 104 and executing the various programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for controlling live-migrations of a plurality of virtual machines, the apparatus comprising:
  a memory configured to store resource-usage state information in association with each of the plurality of virtual machines, the resource-usage state information indicating a change in an amount of resources being used for providing a service; and
  a processor to:
    acquire, from each of the plurality of virtual machines, the resource-usage state information when a first live migration of a first virtual machine is started,
    store, in the memory, the acquired resource-usage state information in association with the each of the plurality of virtual machines,
    calculate a correlation factor indicating a degree of correlation between first resource-usage state information for the first virtual machine and second resource-usage state information for each of one or more target virtual machines other than the first virtual machine, using the acquired resource-usage state information for the each of the plurality of virtual machines,
    execute a second live-migration on a second virtual machine that is selected from the one or more target virtual machines and has a positive correlation factor with respect to the first virtual machine, while executing the first live migration on the first virtual machine, wherein the positive correlation factor indicates a close similarity between the first resource-usage state information and the second resource-usage state information, and
    calculate a transfer time needed for migrating each of the plurality of virtual machines, using a memory-rewriting rate indicating a ratio of a memory-writing time to a unit time, the memory-writing time indicating a time used for writing virtual machine data into a memory area for storing the virtual machine data when migrating the each of the plurality of virtual machines.

2. The apparatus of claim 1, wherein
  the processor acquires, from the each of the plurality of virtual machines, the resource-usage state information collected during a predetermined time period including a live-migration start time at which the first live-migration of the first virtual machine was started, and
  the processor calculates the correlation factor using the resource-usage state information collected during the predetermined time period including the live-migration start time.

3. The apparatus of claim 1, wherein
  the processor:
    selects, from the one or more target virtual machines, at least one target virtual machine each capable of finishing a live-migration thereof before the first live-migration of the first virtual machine is completed, based on the calculated transfer times; and executes a third live-migration on a third virtual machine that is selected from the at least one target virtual machine and has a positive correlation factor with respect to the first virtual machine.

4. The apparatus of claim 1, wherein the processor stores, in the memory, the calculated correlation factor in association with each of pairs of virtual machines in the plurality of virtual machines; and when the first live migration of the first virtual machine is started, the processor selects the second virtual machine having a positive correlation factor using the correlation factors stored in the memory, and executes the second live-migration on the second virtual machine while executing the first live migration on the first virtual machine.

5. The apparatus of claim 1, wherein the plurality of virtual machines are operated on physical machines other than the apparatus, and the physical machines belong to networks different from a network to which the apparatus belongs.

6. The apparatus of claim 1, wherein a time-sequence of transaction counts is used as the resource-usage state information for the each of the plurality of virtual machines, each of the time-sequence of transaction counts indicating the number of transactions that are processed per unit time, by the each of the plurality of virtual machines, at one of a predetermined sequence of times.

7. A method of controlling live-migrations of a plurality of virtual machines, the method comprising:

acquiring, from each of the plurality of virtual machines, resource-usage state information when a first live migration of a first virtual machine is started, the resource-usage state information indicating a change in an amount of resources being used for providing a service;

calculating a correlation factor indicating a degree of correlation between first resource-usage state information for the first virtual machine and second resource-usage state information for each of one or more target virtual machines other than the first virtual machine, using the acquired resource-usage state information for the each of the plurality of virtual machines;

executing a second live-migration on a second virtual machine that is selected from the one or more target virtual machines and has a positive correlation factor with respect to the first virtual machine, while executing the first live migration on the first virtual machine, wherein the positive correlation factor indicates a close similarity between the first resource-usage state information and the second resource-usage state information; and calculating a transfer time needed for migrating each of the plurality of virtual machines, using a memory-rewriting rate indicating a ratio of a memory-writing time to a unit time, the memory-writing time indicating a time used for writing virtual machine data into a memory area for storing the virtual machine data when migrating the each of the plurality of virtual machines.

8. A non-transitory computer-readable medium storing instructions for allowing a computer system to execute a procedure for allocating devices to a communication route, the procedure comprising:

acquiring, from each of the plurality of virtual machines, resource-usage state information when a first live migration of a first virtual machine is started, the resource-usage state information indicating a change in an amount of resources being used for providing a service;

calculating a correlation factor indicating a degree of correlation between first resource-usage state information for the first virtual machine and second resource-usage state information for each of one or more target virtual machines other than the first virtual machine, using the acquired resource-usage state information for the each of the plurality of virtual machines;

executing a second live-migration on a second virtual machine that is selected from the one or more target virtual machines and has a positive correlation factor with respect to the first virtual machine, while executing the first live migration on the first virtual machine, wherein the positive correlation factor indicates a close similarity between the first resource-usage state information and the second resource-usage state information; and calculating a transfer time needed for migrating each of the plurality of virtual machines, using a memory-rewriting rate indicating a ratio of a memory-writing time to a unit time, the memory-writing time indicating a time used for writing virtual machine data into a memory area for storing the virtual machine data when migrating the each of the plurality of virtual machines.

* * * * *